Jan. 5, 1960
S. R. STILES
2,920,125
REGENERATION OF ADSORBENT MATERIALS
USED IN TREATING AN ALKYLATE
Filed Dec. 22, 1955
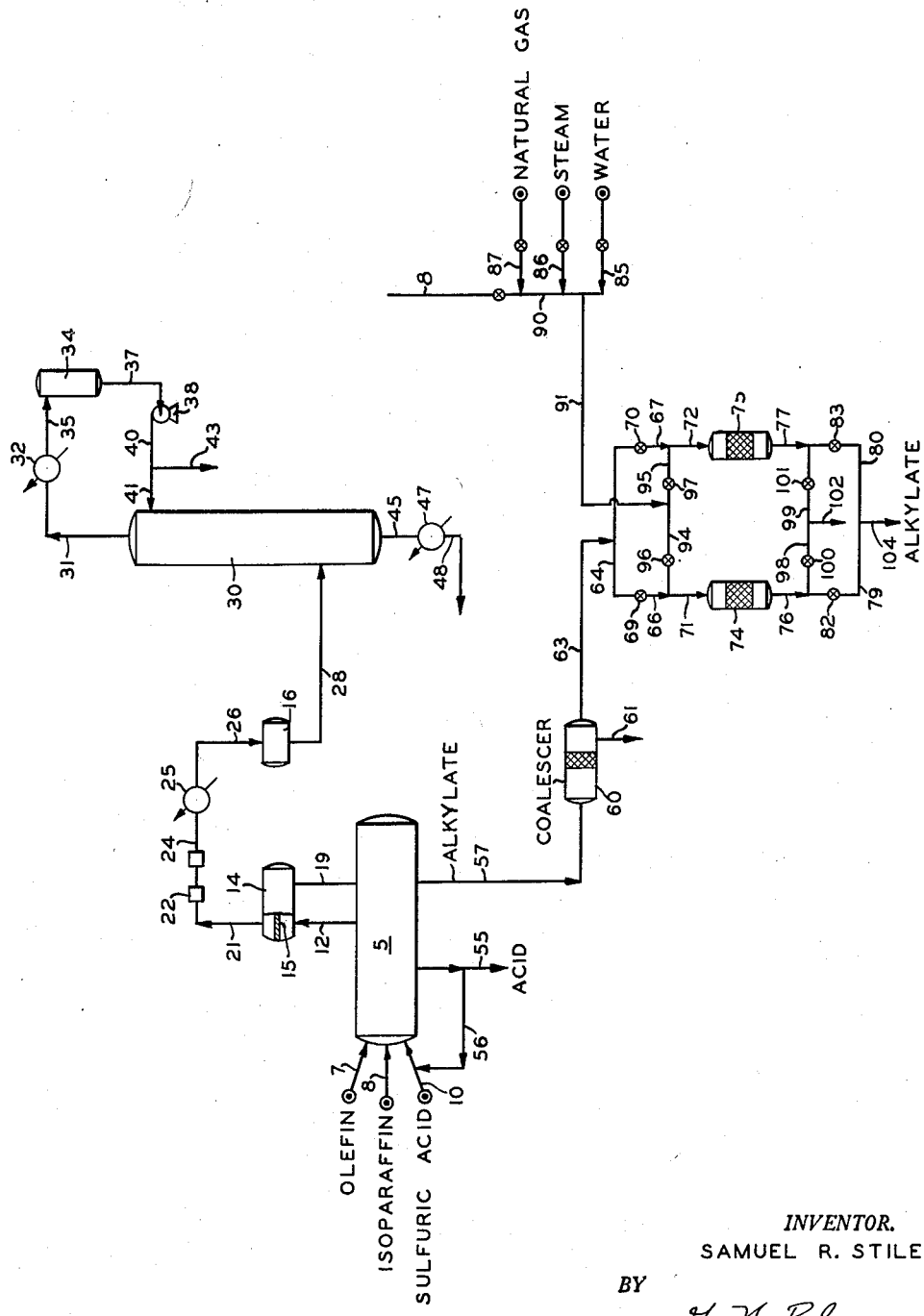
INVENTOR.
SAMUEL R. STILES
BY
*G. H. Palmer*
*H. H. Huth*
ATTORNEYS

United States Patent Office 2,920,125
Patented Jan. 5, 1960

2,920,125

REGENERATION OF ADSORBENT MATERIALS USED IN TREATING AN ALKYLATE

Samuel R. Stiles, Cresskill, N.J., assignor to The M. W. Kellogg Company, Jersey City, N.J., a corporation of Delaware Application December 22, 1955, Serial No. 554,843

9 Claims. (Cl. 260—683.62)

This invention relates to an improved method for the regeneration of adsorbent material contaminated with sulfur bearing compounds, and, more particularly, it pertains to an improved method for regenerating an adsorbent which is used for the adsorption of sulfuric acid, esters of sulfuric acid and related sulfur bearing compounds from the product of an alkylation reaction.

In the regeneration of adsorbent material which is contaminated with sulfur bearing compounds, the final step of the process involves drying and cooling the adsorbent with an inert gas, such as flue gas, nitrogen, natural gas, methane, ethane, etc. The adsorbent is used for the adsorption of sulfur bearing compounds from an alkylation product. The use of the adsorbent for this purpose results in the desorption of appreciable quantities of gas from the adsorbent, consequently, the recovery system of the alkylation unit will contain the desorbed gas and thus interfere with the operation. By means of this invention, a method is suggested whereby this difficulty is substantially overcome.

An object of this invention is to provide an improved method for the regeneration of adsorbent which has been used for the adsorption of sulfur bearing compounds.

Another object of this invention is to provide an improved method for the regeneration of adsorbent which is contaminated with sulfur bearing compounds and which has been used previously for the adsorption of sulfur bearing compounds from the product of an alkylation reaction.

Other objects and advantages will become apparent from the following description and explanation thereof.

It is contemplated by means of the present invention to regenerate an adsorbent which is contaminated with sulfur bearing compounds by the method which comprises washing the contaminated adsorbent with water at a temperature and for a period sufficient to remove a substantial quantity of the contaminants, drying the adsorbent by means of an inert gas, and desorbing the said gas from the adsorbent by means of a hydrocarbon containing at least 3 carbon atoms.

The adsorbent material to be regenerated in accordance with this invention is one which has been previously used for the adsorption of sulfur bearing compounds from the hydrocarbon oil. This material may include adsorbent aluminas such as activated alumina, bauxite, and inorganic silicates such as aluminum silicate, magnesium silicate or mixtures thereof. These materials do not provide equivalent results, however, and the adsorption of sulfur bearing compounds is preferably carried out by treating contaminated hydrocarbons with alumina or bauxite. Because of this the following discussion is directed primarily to the use of these materials. This, however, is not to be construed in any way as limiting the scope of the invention.

The sulfur bearing compounds which are removed by the treatment with alumina or bauxite are present in the oil by reason of previous treatment with sulfuric acid or as a result of a reaction involving sulfuric acid. In this connection, the hydrocarbon oil can be gasoline, naphtha, kerosene, heater oil, furnace oil, lubricating oil, etc., which has been previously treated with sulfuric acid for the removal of olefinic hydrocarbons. The conditions of treatment involved in these processes are well known to those skilled in the art and, for this reason, it is not necessary to enumerate them hereinbelow. Among the various processes involving the use of sulfuric acid and from which the hydrocarbon oil contaminated with sulfur bearing compounds is obtained, the present invention has particular utility in regard to the product of the alkylation process employing the use of sulfuric acid as a catalyst for the reaction between an olefin and an isoparaffin. In the alkylation process, the olefin can contain at least 3 carbon atoms and can be as high as 8 carbon atoms, whereas the isoparaffin can contain at least 4 carbon atoms and it can be as high as 7 carbon atoms. The molar ratio of isoparaffin to olefin is about 10 to about 1000:1, more usually about 15 to about 100:1. The sulfuric acid usually contains a titratable acidity of at least about 90% and it can be in the range of about 90 to about 97%. The sulfuric acid is used in an amount of about 4 to about 40% by weight, based on the quantity of olefin feed. The alkylation reaction is conducted at a temperature of about 5° to about 100° F. and at a pressure of about 0 to about 50 p.s.i.g. As a result of the alkylation reaction, the product material contains sulfuric acid, esters of sulfuric acid and related sulfur bearing compounds. Generally, the alkylation product contains between about 1.0 and about 0 percent by weight of sulfuric acid, more usually between about 0.1 and about 0.01 percent; between about 0.01 and about 0 percent by weight of sulfur in other sulfur bearing compounds, more usually between about 0.005 and about 0.001 percent. In general, for the purpose of this invention, the hydrocarbon oil which is treated by means of the activated alumina contains between about 0.01 and about 0.001 percent by weight of sulfur in sulfur bearing compounds.

The treatment of the hydrocarbon oil containing sulfur bearing compounds by means of the activated alumina is effected at a temperature of about 35° to about 350° F., more usually about 35° to about 130° F., a pressure of about 0 to about 500 p.s.i.g., more usually about 100 to about 200 p.s.i.g. and a weight space velocity measured as the pounds of oil charged to the treating zone per hour per pound of alumina or bauxite present therein, in the range of about 0.5 to about 30 and, more usually, about 2 to about 15. The alumina or bauxite is unusually effective for the purpose of removing sulfuric acid and sulfuric acid esters which are present in the hydrocarbon oil. In the operation, where the sulfur contaminants are being adsorbed from the hydrocarbon oil, the length of treatment varies considerably depending upon the desired purity of product and the extent of contamination of the hydrocarbon oil. Generally, the operation is continued until a significant quantity is present in the treatment product, generally, however, the length of treatment will vary from about 48 to about 96 hours.

The alumina material employed for the purpose of this invention is one which is activated, that is, it possesses the property of adsorbing sulfur bearing compounds from a hydrocarbon oil. In this regard, bauxite is by far the most effective type for this purpose, because it serves effectively and efficiently to remove sulfur bearing compounds from hydrocarbon oils and it is readily regenerated without losing its physical structure significant loss of adsorptive properties for the purpose intended. In general, the bauxite to be used contains about 40 to about 80% by weight of alumina and also it contains iron oxide and about 10 to about 30% by weight of water.

The alumina contaminated with sulfur bearing compounds is subjected to a regeneration treatment which involves, generally, washing with water to desorb a substantial quantity of the sulfur contaminants or all of the same. In general, the alumina contains about 2 to about 8% by weight of sulfur bearing compounds, based on the alumina prior to regeneration. The first step of the regeneration is effected at a temperature of about 40 to about 210° F. and for a period of about 15 minutes to about 25 hours. In this step of the operation, it is preferred that the first phase of the water wash is effected at a low temperature in the order of about 40 to about 100° F. in order to minimize effects due to the adsorption to water on the alumina or bauxite. The first phase of the treatment can be conducted for a period of about 15 minutes to about 5 hours. After the first phase of the washing treatment, the temperature can be raised to fall within the range of about 70 to about 120° F. The second phase of the treatment is effected for a period of about 15 minutes to about 5 hours. The last phase of the washing treatment is effected at a temperature of about 120 to about 210° F. The last phase is conducted for a period of about 1 to about 10 hours. While three phases of the washing treatment have been described, it should be understood that the washing treatment can be effected in more than three phases and the temperature can be raised more gradually in order to minimize undue temperature rises due to the heat of absorption of water. It is desirable to conduct the washing treatment at an elevated temperature, because water displaces sulfur bearing compounds more readily at higher temperatures.

After the alumina has been washed with water it is preferably, but not necessarily, treated with steam which has a temperature of about 220 to about 475° F. The steam serves the two-fold purpose of partially drying the alumina and assisting in the desorption of any residual contaminants contained in the alumina. The steam treatment is conducted for a period of about 0.5 to about 24 hours. Following the treatment with steam, the alumina is dried by means of an inert gas, for example a normally gaseous hydrocarbon containing not more than two carbon atoms, e.g., methane, ethane, etc., at a temperature of about 220 to about 500° F. and for a period of about 1 to about 36 hours. The hydrocarbon serves to displace the adsorbed water by reason of the elevated temperature and the quantity of hydrocarbon employed for the purpose. Following the drying step, the temperature of the alumina can be reduced by employing the same hydrocarbon at a lower temperature. However, the cooling step with the normally gaseous hydrocarbon containing not more than two carbon atoms is optional, because, for this purpose, it is also intended that a hydrocarbon containing at least three carbon atoms also be employed. The cooling step, in any event, is effected by passing any hydrocarbon over the alumina at a temperature within the range desired for treatment of the hydrocarbon oil for the adsorption of sulfur bearing compounds. When a hydrocarbon containing not more than two carbon atoms is employed for the cooling step in accordance with this invention, the alumina is treated with a hydrocarbon containing at least three carbon atoms for the displacement of the lower hydrocarbon from the alumina. This step of the process has the advantage of using a hydrocarbon of close molecular weight to the type of material which is to be treated by means of the alumina, thereby minimizing the problem of contamination. Further, in regard to the use of alumina for the treatment of an alkylation product, it is preferred to use one or more of the hydrocarbons present in the alkylation feed in order to minimize the problem of contamination in the product recovery system. Accordingly, the use of a hydrocarbon containing at least three carbon atoms is effective at a temperature falling within the range of the treatment of the contaminated hydrocarbon with the alumina. Further, the operation is carried on for a period sufficient to desorb a substantial quantity or all of the lower molecular weight hydrocarbon. In general, the hydrocarbon containing at least three carbon atoms is contacted with the alumina or bauxite at a temperature of about 50 to about 200° F., at a pressure of about atmospheric to about 100 p.s.i.g. and for a period of about 0.5 to about 4 hours.

In order to provide a better understanding of this invention, reference will be had to the accompanying drawing which contains a specific embodiment thereof.

In the drawing, a feed material containing olefin, isobutane, normal butane and propane is fed to the alkylation reactor 5 by means of line 7 at the rate of 3000 BPD. Similarly, isoparaffin recycle and feed is fed to the alkylation reactor 5 by means of line 8 at the rate of 11,000 BPD; whereas sulfuric acid, having a 99% titratable acidity is fed to the alkylation reactor 5 by means of line 10 at the rate of 80,000 pounds per day. The alkylation reaction is effected at a temperature of about 35° F. and at a pressure of about 5 p.s.i.g. By virtue of the conditions maintained within the alkylation reactor, part of the isobutane, normal butane and propane which are unreacted become vaporized and are yielded overhead therefrom by means of line 12. The vaporized hydrocarbons pass to drum 14 containing a coalescing pad. Any liquid hydrocarbon acid, acid esters, etc. entrained with the vaporous hydrocarbon are separated therefrom in zone 15 and returned to the alkylation reactor by means of line 19. The hydrocarbon vapors are discharged from the top of zone 15 by means of line 21, and they are charged to a compressor 22 wherein the pressure is raised to about 80 p.s.i.g. and the temperature is raised to about 160° F. The compressed vapors are discharged from compressor 22 by means of line 24, and they are fed to a cooler 25 wherein the temperature is reduced to about 100° F. thereby resulting in the condensation of the hydrocarbons. The condensed hydrocarbons are discharged from cooler 25 by means of line 26 and are passed to refrigerant liquid receiver 16.

The condensed hydrocarbons are discharged from receiver 16 by means of line 28, and they are fed to a depropanizer column 30. In the depropanizer column the top temperature is maintained at about 120° F. and a pressure of about 225 p.s.i.g.; whereas the bottom temperature is about 190° F. Propane vapors are discharged overhead from column 30 by means of line 31 and thence, they are cooled by means of condenser 32 to a temperature of about 115° F. The condensed propane is passed to a drum 34 by means of line 35. The liquid propane is withdrawn from the bottom of drum 34 by means of line 37, and then it is transported by means of pump 38 to line 40. The propane flowing in line 40 is divided such that a portion, namely, about 4600 BPD is recycled to column 30 by means of line 41; whereas the remainder, viz., about 500 BPD is discharged from the system by means of line 43. The isobutane product is discharged from the bottom of column 30 by means of line 45 and thence, it is cooled to a temperature of about 90° F. by means of cooler 47. This material is then returned to the alkylation reactor through conduit 48.

Acid is separated from the alkylate product within the alkylation reactor 5 and it is discharged from the bottom thereof by means of line 55 at the rate of about 85,000 pounds per day. At least a portion of this material is recirculated to the fresh acid line 10 via line 56. The alkylate product is also discharged from the bottom of alkylation reactor 5 by means of line 57 at the rate of about 6000 BPD. The alkylate product contains about 0.02% by weight of emulsified sulfuric acid and about 0.002% by weight of sulfur in other sulfur bearing compounds, principally esters of sulfuric acid. In order to reduce the tendency for sulfuric acid to react with bauxite, the alkylate product is previously treated by means of a coalescer which serves to remove about 80% of the sulfuric acid and esters which are present in the alkylate product. Accordingly, the alkylate product is passed from line 57 to a coalescer 60 which contains strips of glass wool for the purpose. Acidic material removed in the coalescer is withdrawn therefrom through line 61. The alkylate product is discharged from the coalescer by means of line 63 and it is passed to header 64 which divides into lines 66 and 67 containing valves 69 and 70, respectively. Lines 66 and 67 are in turn connected to lines 71 and 72, respectively, and the latter are connected to the top of treaters 74 and 75, respectively. Fluid material may be discharged from the bottom of treaters 74 and 75 by means of lines 76 and 77, respectively. The alkylate product is discharged from lines 76 and 77 by means of lines 79 and 80, respectively, which in turn contain valves 82 and 83, respectively, and passes through line 104 to the deisobutanizer tower (not shown). For the purpose of regeneration, water, steam and natural gas are supplied from valved lines 85, 86 and 87. Natural gas is desorbed from the bauxite with isobutane recycle supplied from the valved line 8. All of the regeneration streams are connected to a header 90 which in turn is connected to line 91. Line 91 divides into lines 94 and 95 which contain valves 96 and 97, respectively. The regeneration fluids are discharged from the bottom of treater 74 and 75 by means of lines 76 and 77 which are connected to lines 98 and 99, respectively, and contain valves 100 and 101, respectively. Lines 98 and 99 are connected to line 102 by means of which the material is discharged from the system. Similarly, lines 79 and 80 are connected to line 104 by which alkylate is discharged from the system.

In operation, one of the treaters is being used for the removal of sulfur contaminants from the alkylate product while the other treater is undergoing regeneration. Assuming treater 74 is being used for removing contaminants from the alkylate product, valves 69 and 82 are in an open position whereas valves 96 and 100 are closed. For the regeneration of treater 75, valves 70 and 83 are closed whereas valves 97 and 101 are open. Treaters 74 and 75 contain bauxite having 20–40 mesh. Each treater contains about 8000 pounds of bauxite. The temperature of treater 74 is about 45° F. and the pressure is about 150 p.s.i.g. In regard to the generation of treater 75, the following operational sequence is used:

| Steps | Rate | Temp., °F. | Times, Hrs. |
|---|---|---|---|
| 1. Emptying Contactor | 420 g.p.h | 45 | 2.5 |
| 2. Water Washing | 1,500 g.p.h | 80 | 1.5 |
| 3. Water Washing | 1,500 g.p.h | 100 | 0.5 |
| 4. Water Washing | 1,500 g.p.h | 125 | 0.5 |
| 5. Water Washing | 1,500 g.p.h | 150 | 0.5 |
| 6. Water Washing | 3,000 g.p.h | 175 | 0.5 |
| 7. Water Washing | 3,000 g.p.h | 200 | 0.5 |
| 8. Water Washing | 5,000 g.p.h | 200 | 1.0 |
| 9. Steam Heating | 5,000 # hr. max | 350 | 6.0 |
| 10. Natural Gas Drying | 25,000 s.c.f.h | 350 | [1] 12.0 to 14.0 |
| 11. Natural Gas Cooling | 25,000 s.c.f.h | 80 | 5.0 |
| 12. Purging with Isobutane | 5,000 s.c.f.h | 80 | 1.0 |
| 13. Filling Contactor | 450 g.p.h | 45 | 2.5 |

[1] Dry 2.0 hours after bauxite reaches temperature of about 290° F.

Having thus given a final description of my invention, it should be understood that no undue limitations or restrictions are to be imposed by reason thereof, but that the scope of this invention is defined by the appended claims.

I claim:

1. A process which comprises reacting an olefin with an isoparaffin in the presence of sulfuric acid to produce an alkylate hydrocarbon product containing sulfur-bearing compound contaminants and unreacted isoparaffin, treating the alkylate product with an alumina adsorbent to adsorb the sulfur-bearing compounds, separating the treated alkylate from the alumina now contaminated with said sulfur-bearing compounds, contacting said alumina with water at progressively increasing temperatures until a temperature of about 200° F. is reached to desorb said contaminants, drying said water washed alumina and contacting said dried alumina with unreacted isoparaffin prior to contact with additional alkylate product containing sulfur-bearing compounds.

2. The process of claim 1 in which the alumina is bauxite.

3. In a sulfuric acid alkylation process wherein an alkylate hydrocarbon effluent stream is separated from an alkylation reaction zone containing alkylate product, unreacted isoparaffin, and sulfur-bearing compounds and wherein said alkylate stream is contacted with a solid adsorbent material selected from the group consisting of alumina, inorganic silicates and mixtures thereof to remove said sulfur-bearing compounds from said alkylate hydrocarbon stream thereby contaminating said solid adsorbent material with said sulfur compounds, the improved method for regenerating said contaminated solid adsorbent material for reuse in the process which comprises washing said contaminated adsorbent material with water at a temperature from about 40° F. to about 210° F., treating said water washed adsorbent material with steam to remove the major portion of said wash water from said adsorbent material, drying the steam treated adsorbent material with natural gas and desorbing natural gas from said adsorbent material by contacting the adsorbent material with an isoparaffin hydrocarbon of said alkylate stream, said hydrocarbon having at least 3 carbon atoms per molecule prior to contact with additional alkylate hydrocarbon effluent contaminated with sulfur-bearing compounds.

4. In a sulfuric acid alkylation process wherein an alkylate hydrocarbon product stream is separated from the alkylation zone containing alkylate product, unreacted isoparaffins and sulfur-bearing compounds and wherein the hydrocarbon product is passed in contact with a bauxite adsorbent to remove said sulfur compounds from said alkylate hydrocarbon stream thereby contaminating said bauxite adsorbent, the improved method for regenerating said bauxite adsorbent for reuse in the process which comprises washing said contaminated bauxite adsorbent with water at progressively increasing temperatures, treating said water washed adsorbent with steam at a temperature within the range of from about 220° F. to about 475° F., drying and cooling said steam treated adsorbent with an inert gaseous hydrocarbon containing not more than two carbon atoms per molecule and treating said dried adsorbent with isoparaffin alkylation reactant prior to contact with said alkylation hydrocarbon product stream contaminated with sulfur-bearing compounds.

5. In a sulfuric acid alkylation process wherein an alkylate hydrocarbon product is separated from the alkylation zone containing alkylate product, unreacted isoparaffin and sulfur-bearing compounds and wherein the hydrocarbon product is passed in contact with alumina to remove said sulfur bearing compounds from said alkylate hydrocarbon thereby contaminating said alumina adsorbent the improved process for regenerating the adsorbent which comprises washing the contaminated alumina with water at a temperature of between about 40° F. and about 210° F. to remove sulfur bearing compounds from said effluent, treating said water-washed adsorbent with steam for a period of from about 0.5 to about 24 hours, drying the steam treated alumina by means of a normally gaseous hydrocarbon containing not more than 2 carbon atoms at a temperature of between about 220° F. and about 500° F. and desorbing said gaseous hydrocarbon and cooling said adsorbent with the isoparaffin reactant of the alkylation effluent prior to contact with an additional amount of said alkylation hydrocarbon product contaminated with sulfur-bearing compounds.

6. A process which comprises reacting an olefin with an isoparaffin in the presence of sulfuric acid to produce an alkylate hydrocarbon product containing sulfur-bearing compound contaminants and unreacted isoparaffin, treating the alkylate product with an adsorbent selected from the group consisting of alumina, an inorganic silicate and mixtures thereof to adsorb the sulfur-bearing compounds, separating the treated alkylate from the adsorbent now contaminated with said sulfur-bearing compounds, contacting said adsorbent with water at progressively increasing temperatures from about 40° F. to about 210° F. to desorb said contaminants, drying said water-washed adsorbent by means of an inert gas, and desorbing said inert gas and cooling said adsorbent by contacting with an isoparaffin of the alkylation hydrocarbon product mixture, said hydrocarbon having at least 3 carbon atoms per molecule, prior to contact with additional quantities of alkylate hydrocarbon effluent containing sulfur-bearing compounds.

7. A process which comprises reacting an olefin with an isoparaffin in the presence of sulfuric acid to produce an alkylate hydrocarbon product containing sulfur-bearing compound contaminants and unreacted isoparaffin, treating the alkylate product with an adsorbent selected from the group consisting of alumina, an inorganic silicate and mixtures thereof to adsorb the sulfur-bearing compounds, separating the treated alkylate from the adsorbent now contaminated with said sulfur-bearing compounds, contacting said adsorbent with water at progressively increasing temperatures from about 40° F. to about 210° F. to desorb said contaminants, drying said water-washed adsorbent and contacting said dried adsorbent with isoparaffin reactant prior to contact with additional alkylate product containing sulfur-bearing compounds.

8. The process of claim 7 in which the inorganic silicate is magnesium silicate.

9. The process of claim 7 in which the inorganic silicate is aluminum silicate.

References Cited in the file of this patent

UNITED STATES PATENTS

| | | |
|---|---|---|
| 1,868,581 | Miller | July 26, 1932 |
| 2,039,798 | Ipatieff | May 5, 1936 |
| 2,393,154 | Franklin | Jan. 15, 1946 |
| 2,393,531 | Hart | Jan. 22, 1946 |
| 2,395,491 | Mavity | Feb. 26, 1946 |
| 2,398,495 | D'Ouville et al. | Apr. 16, 1946 |
| 2,425,535 | Hibshman | Aug. 12, 1947 |
| 2,582,415 | Claussen | Jan. 15, 1952 |